April 4, 1967     E. J. CERVENKA     3,312,288
ROD WEEDER ATTACHMENT
Filed July 27, 1964     4 Sheets-Sheet 1

INVENTOR
Edward J. Cervenka
BY
ATTORNEYS

INVENTOR
Edward J. Cervenka

BY

ATTORNEYS

INVENTOR
Edward J. Cervenka

BY
ATTORNEYS

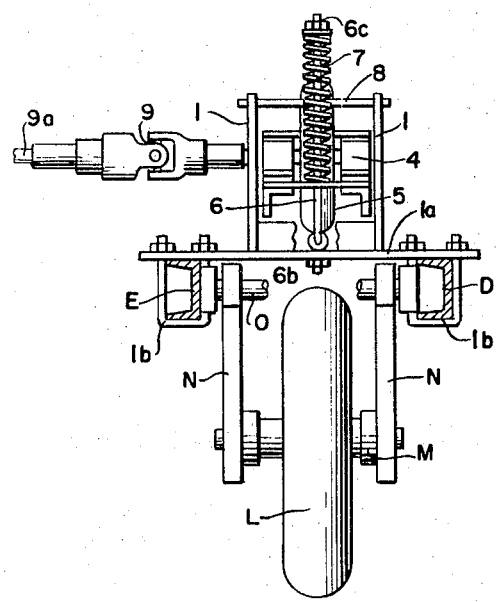
FIG.8.
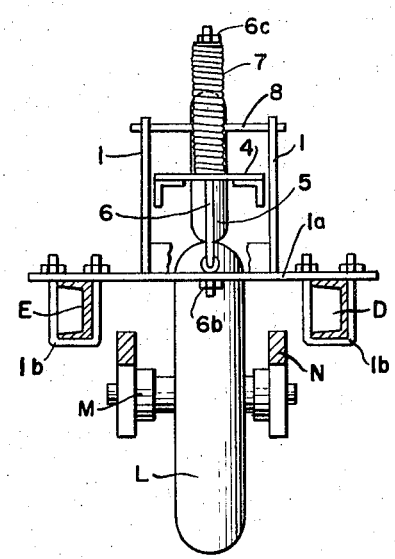
FIG.9.
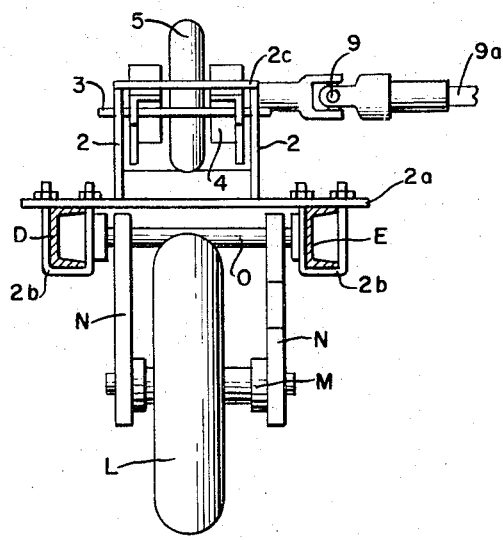
FIG.10.
FIG.11.
INVENTOR
Edward J. Cervenka

United States Patent Office 3,312,288
Patented Apr. 4, 1967

3,312,288
ROD WEEDER ATTACHMENT
Edward J. Cervenka, Rte. 2, Moccasin, Mont. 59462
Filed July 27, 1964, Ser. No. 385,154
14 Claims. (Cl. 172—44)

This invention is a novel rod weeder attachment for wheeled tool bar frames, the weeder attachment being designed for mounting on various makes of commercial tool bar frames now on the market such as Graham-Hoeme plow, the Jeffroy, John Deere, I.H.C., Krause, and other well-known makes, my attachment being so designed that it need not be entirely removed from the tool bar frame when it is desired to use the tool bar without the weeder, as is often the case, since only the weeder rod itself and its supporting brackets and rod driving boot need be removed.

Power for rotating the rod weeder is derived from the use of two small wheels with pneumatic tires which in one vertical adjustment of the tool bar frame frictionally engage the two ground wheels of the tool bar frame, which ground wheels are also rubber tired, and are mounted in a framework which is hinged at one end and is free to move up and down within limits, as the ground wheels of the tool bar do according to the depth at which the operator sets the tool bars to run in the ground, the drive wheels of the attachment disengaging from the tool bar ground wheels when the tool bar frame is raised to bring the tool bars completely out of the ground.

Friction between the ground wheels of the tool bar and the drive wheels of the weeder attachment is maintained by coiled springs on adjustable rods at the front ends of pivoted frames which support the drive wheels. By this arrangement the two drive wheels running on the ground wheels of the tool bar also gives a reverse motion to the weeder rod which is necessary to produce an efficient and clogproof rod weeder.

Power from the drive wheels of the weeder attachment is transmitted through telescoping shaft sections to a center main bearing mounted at the center of the tool bar frame, said shafts being provided with universal joints, and the shafts rotating a chain sprocket in the center main bearing.

In rear of the chain sprocket of the center main bearing is a jack shaft having another chain sprocket driven by a chain from the sprocket of the center main bearing, said jack shaft carrying a further sprocket which drives through a chain a still further chain sprocket in the upper end of a boot mounted on a tool bar at the rear end of the tool bar frame, which latter sprocket drives through a chain a sprocket on the rod weeder shaft journaled in the lower end of the boot, which boot carries at its lower end a hardened ground engaging shoe removably secured to the lower end thereof.

The principal object of the invention is to provide a rod weeder attachment of the above type adapted to be easily and readily installed on a conventional tool bar frame in such manner that all parts except the boot and weeder rod with its supporting brackets may be left permanently on the tool bar frame, whether currently being used or not.

Another object of the invention is to provide an assembly as above described in which the drive wheels are provided with means for locking them in raised position so that they will not contact the ground wheels of the tool bar frame and thus revolve the weeder rod when the rod is not being used.

A further object of the invention is to provide an attachment which is designed with a view for easy maintenance, since only standard easy-to-obtain parts are to be used.

Summarizing, the essential features of my novel design are the provision of drive wheel frames for the weeder attachment with their provision for movement up or down with the ground wheels of the tool bar frame; also the locking-out feature of the drive wheels when the rod weeder attachment is not being used; also the flexible and elongatable drive between the drive wheels and the chain sprocket of the center main bearing; also the center main bearing itself; also the jack shaft together with its mounting plate for the purpose of chain adjustment and for alignment of the jack shaft with the boot; also the hard surface boot bottom; also the use of universal joints on either side of the lower part of the boot to locate the weeder rod endwise of the assembly; also the method of extending the jack shaft to align with the boot when the latter is mounted on a tool bar shank which is not in line with the jack shaft; and also the use of two drive wheels for the rod weeder attachment engaging the two ground wheels of the tool bar frame.

Other minor objects of the invention will be hereinafter set forth.

I will explain the invention with reference to the accompanying drawings, which illustrate one practical embodiment thereof, to enable others familiar with the art to adopt and use the same; and will summarize in the claims, the novel features of construction, and novel combinations of parts, for which protection is desired.

In said drawings:

FIG. 8 is an enlarged front view of the drive wheel frame, partly in section, showing the frame in raised position to disengage the rod weeder drive wheels from the ground wheels of the tool bar frame.

FIG. 9 is a view similar to FIG. 8 but showing the drive wheel frame lowered to bring the wheels into frictional engagement.

FIG. 10 is a rear view of the drive wheel frame in raised position.

FIG. 11 is a detail elevation.

Figure 1:
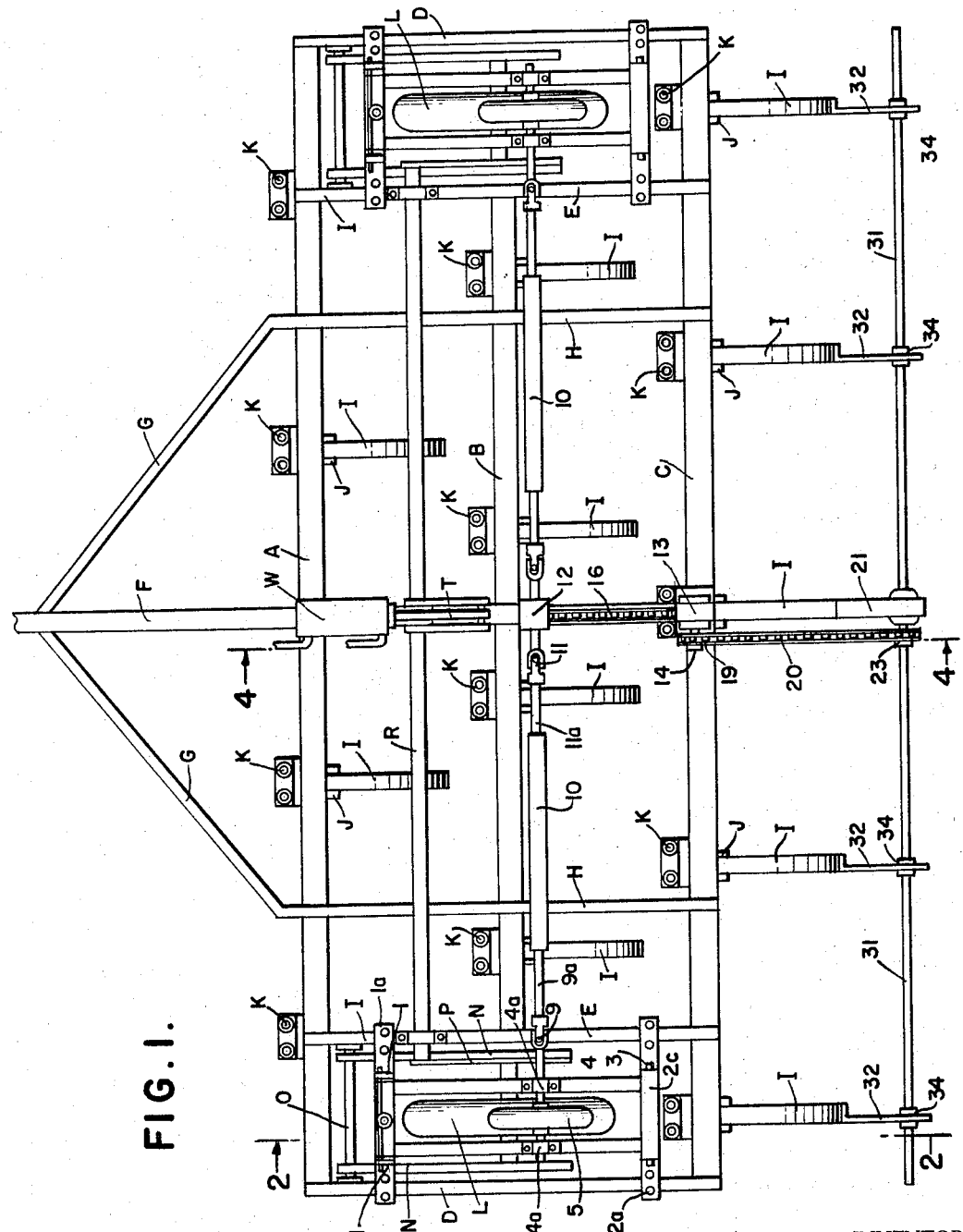
FIG. 1 is a top plan view showing my novel rod weeder attachment mounted upon a conventional tool bar frame.

My rod weeder attachment may be mounted on any commercial type tool bar frame which is vertically adjustable on ground wheels disposed at the sides thereof, with means for lowering the frame with respect to the ground wheels.

The tool bar frame shown in the drawings consists of a front member A, an intermediate member B, and rear member C preferably formed of I-beams extending the width of the tool frame, members A–C being held in spaced relation by means of side members D and intermediate members E spaced from the side members D. The frame is provided with a tongue F having braces G, the tongue F being disposed axially of the frame and extending substantially to the rear end thereof, while the rear ends of the braces G are disposed parallel with the side members D and form auxiliary longitudinal strengthening members H. The particular form of the tool bar frame however forms no part of my present invention.

Each of the front, intermediate and rear members A–C carry thereon in spaced relation tool bars I arranged as shown in FIG. 1 so as to be staggered, the same being of arcuate shape and the lower ends thereof being adapted to penetrate the ground surface when the tool bar frame is lowered, and the upper ends thereof being pivoted in brackets J adjacent the rear ends, and the upper ends being subjected to pressure of springs K when the points of the shanks of the tool bars I strike a rock, said arrangement of springs K being a conventional part of the safety release mechanism built into the tool bar.

Figure 2:
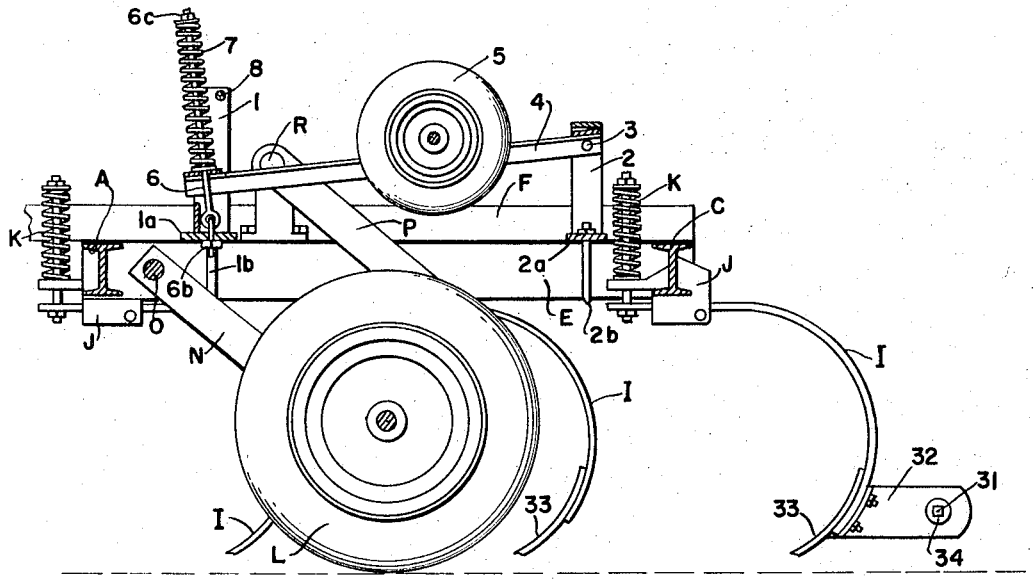
FIG. 2 is an enlarged longitudinal section on the line 2—2, FIG. 1, showing the drive wheels of the rod weeder attachment raised out of contact with the ground wheels of the tool bar frame, and showing the weeder rod and tool bars raised above the ground surface.
Figure 3:
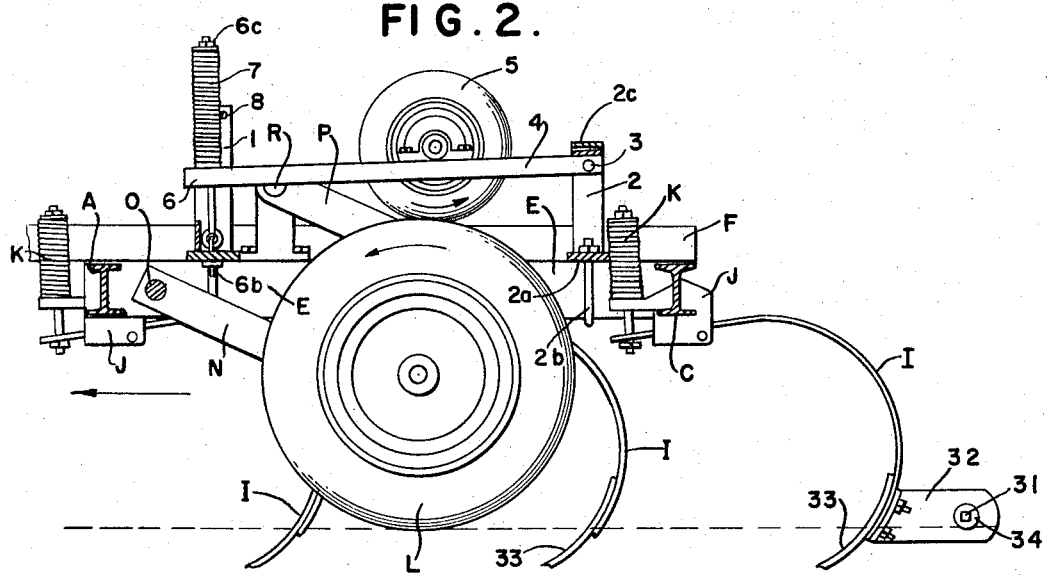
FIG. 3 is a view similar to FIG. 2 but showing the drive wheels of the rod weeder attachment lowered with respect to the ground wheels of the tool bar frame with the sets of wheels in frictional driving engagement; and showing the lower ends of the tool bars disposed below the ground surface, and showing the weeder rod disposed at substantially the level of the ground surface.
Figure 4:
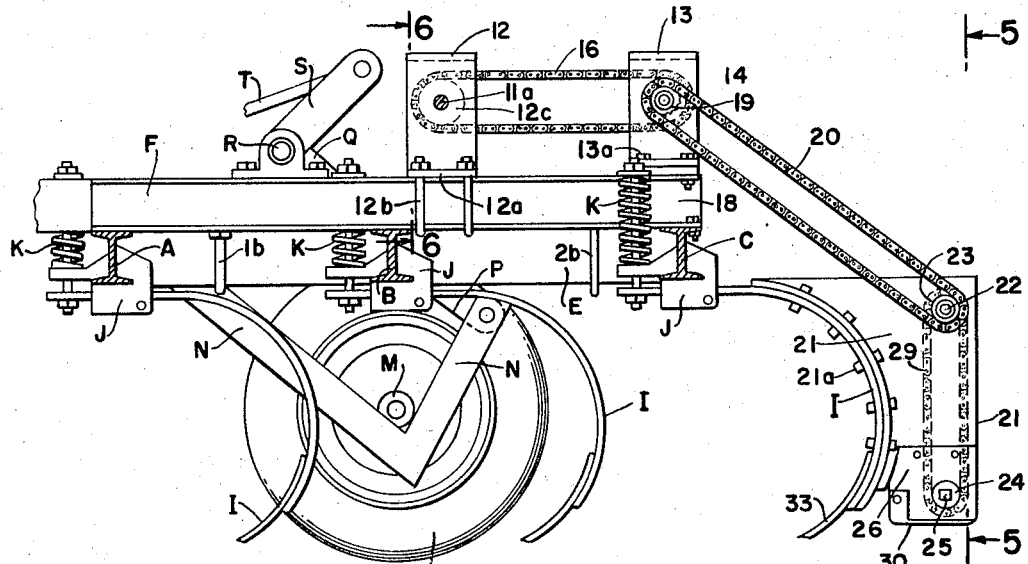
FIG. 4 is an enlarged longitudinal section on the line 4—4, FIG. 1, showing the drive from the center main bearing through the jack shaft and through the boot for rotating the weeder rod.

The ground wheels L of the tool bar frame are mounted for vertical movement with respect to the tool bar frame A–E and as shown are journaled in bearings M, FIG. 4, in the heels of angle frames N one leg of which is pivoted as at O, FIGS. 2 and 3, to the adjacent longitudinal frame members D and E, respectively, at each side of the frame, the other shorter leg of the angle frames N, as shown in FIG. 4, being pivoted to a link P, which in turn is pivotally connected to an arm Q fixed to a shaft R which may be oscillated by an arm S, FIG. 4, connected by a rod T, FIG. 4, to an hydraulic cylinder W, FIG. 1, whereby when the cylinder W is actuated the shaft R will be rotated to cause simultaneous raising or lowering of the tool bar frame with respect to the ground wheels L to bring the tool bars I into or out of engagement with the ground surface. Any other desired means for raising and lowering the tool bar frame with respect to the ground wheels L, however, may be utilized.

As shown in FIG. 1, the intermediate cross member B of the frame terminates at and is secured to the longitudinal frame members E, this arrangement providing open bays at each side of the tool bar frame for the reception of the ground wheels L and for the drive wheels of the rod weeder attachment, which drive wheels are supported above the open bays in the following manner.

As shown, extending across the open bays at each side of the machine are front standards 1 consisting of spaced upright plates or bars mounted upon a base member 1a, FIG. 8, of length to span the frame members D and E, respectively, the same being clamped down upon the tops of the frames D and E by means of U-bolts 1b so as to be adjustable on said frame members D and E. The top of the front standard 1 is open. In rear of each front standard 1 is a similar rear standard 2, FIG. 10, having a base plate 2a which bridges the frame members D and E and has its ends clamped thereto by U-bolts 2b. Preferably the upper end of the rear standard 2 is closed by a plate 2c and in the rear standard below the top plate 2c is a pivot rod 3 on which is journaled one end of a drive wheel frame 4 which is of open rectangular shape and fits within the uprights of the front and rear standards 1–2, as shown in FIGS. 1, 2 and 3, whereby the frame 4 may be pivoted upwardly and downwardly on rod 3.

At approximately the center of each drive wheel frame 4, at each side thereof, are bearings 4a (FIG. 1) for the shaft of a drive wheel 5 carrying a pneumatic tire and disposed above the ground wheel L but adapted to contact with the ground wheel L when the tool bar frame is lowered, as shown in FIG. 3, whereby the drive wheel 5 will be frictionally driven by the ground wheel L, but in the opposite direction, as indicated by the arrows in FIG. 3.

The front end of each frame 4 is normally urged downwardly by means on a bolt 6 connected by eye-bolt 6b, to the plate 1a of the front standard, the bolt 6 passing upwardly through a hole in the front end of the frame 4 and extending above the frame and carrying a nut 6c on its upper end. A spring 7 under compression is interposed between the nut 6c and the top of the frame 4 to urge the forward end of frame 4 in a downwardly direction to yieldably maintain contact of the drive wheel 5 against the ground wheel L when the tool bar frame is lowered, as shown in FIG. 3; but when the tool frame is raised, as shown in FIG. 2, the spring 7 may expand without however bringing the drive wheel 5 into contact with the ground wheel L.

In event it is desired to use the tool bar frame A–E for purposes other than for rod-weeding, means are provided to maintain the front end of the frame 4 in raised position to prevent contact of the drive wheel 5 with the related ground wheel L, even though the tool bar frame is lowered to bring the tool bars I into contact with the ground surface, said means consisting of a rod 8 passing through perforations in the upper ends of the uprights of the front standard 1, as shown more particularly in FIG. 11, with the rod 8 underlying the front end of the raised frame 4, the rod 8 thus preventing the front end of the frame 4 from lowering under pressure of the spring 7.

As shown in FIG. 1, each drive wheel 5 drives a shaft 9a having therein a universal joint 9, the inwardly extending portion of the shaft 9a being of non-circular cross section, such as square, and the square portion 9a making a sliding fit within a floating hollow square shaft connecting member 10, so that the combined shafts 9a and 10 may be axially adjustable to allow for increase or decrease in overall length of the shaft as the vertically movable drive wheel 5 moves upwardly or downwardly with relation to the relatively fixed ground wheel L of the tool bar frame, as shown in FIGS. 2 and 3.

Figures 5, 6, 7:
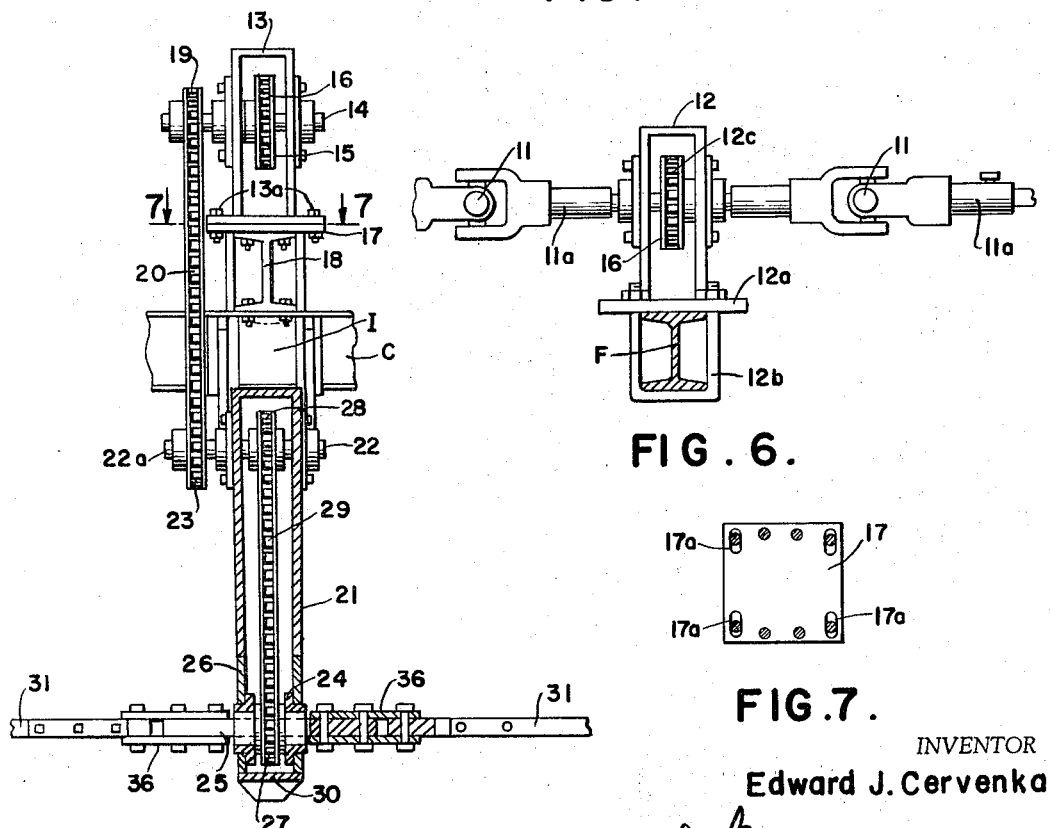
FIG. 5 is an enlarged vertical section on the line 5—5, FIG. 4.
FIG. 6 is an enlarged vertical section on the line 6—6, FIG. 4.
FIG. 7 is a horizontal section on the line 7—7, FIG. 5.

At the opposite end of each floating member 10 is a second non-circular shaft 11a connected by a universal joint 11 to the shaft of a chain sprocket disposed axially of the tool bar frame and mounted in a center main bearing assembly 12 mounted upon the tongue F, as shown more particularly in FIGS. 4 and 6. As shown in said figures, the center main bearing assembly consists of a substantially inverted U-shaped casing 12 mounted upon a plate 12a which is clamped down upon the tongue F at the center of the tool bar frame by means of U-bolts 12b (FIGS. 4 and 6); and journaled within the casing 12 is a chain sprocket 12c to the shaft of which the universal joints 11a are operatively connected, whereby the drive from both drive wheels 5 at opposite sides of the tool bar frame will be transmitted to the chain sprocket 12c of the center main bearing 12 through the provision of the non-circular sections of the shafts 9a and 11a engaging similar non-circular portions of the sleeve 10, which arrangement permits the drive shafts to be extended or retracted as hereinbefore explained. The use of the U-bolts 12b permits adjustment of the center main bearing 12 axially of the tongue F of the tool bar frame to allow for adjustment of chain 16 (FIG. 4) hereinafter described.

At the rear end of the tool bar frame in line with the tongue F is a jack shaft assembly consisting of an open frame 13 in which is mounted a jack shaft 14 (FIGS. 1, 4 and 5), carrying within the frame 13 a chain sprocket 15 in substantial alignment with the chain sprocket 12c, and an endless chain 16 runs around the sprockets 12c and 15 so as to drive jack shaft 14 by the sprocket 12c.

The jack shaft assembly 13 is adjustably mounted at the rear end of the tool bar frame so that the same may be aligned with the central tool bar I, FIGS. 4 and 5, the assembly 13 being mounted upon a pedestal 18 (FIGS. 4 and 5), in alignment with the rear end of the tongue F, the pedestal 18 being in the nature of an I-beam having its lower flanges bolted to the upper flanges of the underlying frame member C of the tool bar frame. Bolted to the upper flange of the pedestal 18, as shown in FIGS. 5 and 7, is a mounting plate 17 having at its corners elongated slots 17a for the reception of bolts 13a which pass through perforations in the base of the assembly 13 and through the slots 17a in the mounting plate 17, whereby the jack shaft assembly 13 may be adjusted axially of the tool bar frame to adjust the tension of the chain 16.

On one end of the jack shaft 14 exterior of the assembly 13 is a sprocket shaft 19 in alignment with a sprocket 23 at the upper end of the boot 21 hereinafter described, sprocket 19 driving the boot sprocket by means of a chain 20, as shown in FIGS. 1, 4 and 5. By use of the chains 16 and 20, and due to the spacing between the center main bearing 12, jack shaft assembly 13 and the boot 21, it is not essential that the jack shaft assembly be too accurately aligned with respect to the center tool bar I for proper driving relationship of the chains and sprockets. However, in event the boot 21 is not mounted on a tool bar I disposed directly behind the jack shaft assembly the shaft 14 carrying the sprocket 19 may be somewhat elongated or if sufficiently elongated may in fact have its outer end journaled in an auxiliary support (not shown) similar to the jack shaft assembly 13, and the chain sprocket 19 disposed on said extended shaft in a position opposite the chain sprocket 23 of the boot 21.

As shown in FIGS. 1, 4 and 5, the boot 21 comprises a substantially rectangular casing of width approximating that of the tool bar I and has its front face 21a formed arcuately to conform with the curvature of the tool bar I, the arcuate face being bolted to the center tool bar I or removably secured thereto in any other desired manner.

The top of the boot 21 is substantially level with the top of the tool bar I, and the lower end of the boot 21 is disposed above the lower end of the tool bar I, as shown in FIG. 4. In the upper portion of the boot 21, between the sides thereof, is journaled a shaft 22 in suitable bearings and having one end 22a extending beyond the adjacent side of the boot and carrying a chain sprocket 23 in line with the chain sprocket 19 of the jack shaft assembly 13, the chain 20 running around the sprockets 19 and 23, as shown in FIGS. 4 and 5. The bearings for the shaft 22 may be of ball bearing lifetime sealed type so as to withstand wear.

At the lower end of the boot 21 are chilled-iron bearings 24 receiving the non-circular rod weeder shaft 25, the bearings 24 being mounted in removable side plates 26 preferably of high carbon steel so as to be durable. On the non-circular shaft 25 within the sides of the boot 21 is a chain sprocket 27 in line with a chain sprocket 28 on the upper sprocket shaft 22, and a chain 29 runs over the sprockets 27 and 28 to rotate the rod weeder shaft 25 in its bearings 24. At the bottom of the boot 21 is a removable and replaceable boot bottom 30 which is hardened along its entire surface so as to prevent wear on the bottom of the side plates 26 and on the boot bottom 21 during operation in the field. The boot bottom also prevents chain 29 from carrying wet dirt into the forward part of the boot and depositing same along the inside front where the dirt would harden and cause wear and abrasion on the chain 29.

In alignment with the rod weeder shaft 25 at each side of the boot 21 are rod weeder shafts 31 which are mounted in brackets 32 removably attached to the lower portions of the tool bars I at each side of the center tool bar I, which carries the boot 21, extending rearwardly of the tool bars, whereby the rod weeder shaft 26 will be disposed at an elevation slightly above the chisel or cultivator sweeps 33 (FIG. 4) which are carried by each of the tool bars I. Preferably the non-circular rod weeders 31 are mounted in chilled-iron spools 34 which are mounted in chilled-iron spool bearings carried by the brackets 32.

As shown in FIG. 5, the rod weeder shafts 31 are connected respectively to the extended ends of the sprocket shaft 25 of boot 21 by means of universal joints 36. The purpose of the universal joints 36 on either side of the boot 21 is to protect the weeder rods 31 and chilled-iron internal parts of the boot 21 from breakage in event the shank of the tool bar I should strike a large stone or some other solid object in the soil while operating over the soil. The shanks on all modern tool bars are spring-loaded at their upper ends as indicated at K to prevent damage to them and the cultivator chisels or sweeps, the tool bars merely snapping back over such obstructions. The rod weeder rods 31 therefore must be able to give with the shanks of the tool bars I, and a universal joint 36 in the rods 31 at either side of the boot 21 as above shown permits this operation.

Since the universal joints 36 are located as shown in FIG. 5 they perform still another duty, i.e., that of locating the rod endwise. Where there are six or more shanks in the rearmost row of tool bars I more such universal joints 36 may be used to protect the rods 31 from being bent and the chilled-iron rods support brackets from being broken when a shank snaps back upon striking an obstruction. However, a tool bar with only five shanks, as shown in FIG. 1, would normally require use of only one universal joint 36 at each side of the boot 21.

My rod weeder attachments once installed on the tool bar frame need never be removed when it is desired to operate the tool bar frame without the rod weeder, as is often the case. The only parts that are removed are the rods 31, boot 21, boot drive chain 20, and rod support brackets 32, which results in a considerable saving in time and effort to a busy operator. The rest of the machinery of the rod weeder attachment is locked out of operation by raising the wheels frames 4 above the lock-out rods 8. All other rod weeder attachments so far designed must be completely removed from the tool bar frame when it is desired to operate the tool bar without the rod weeder attachment.

My rod weeder attachment is designed to be easy to manufacture, there being no complicated forgings and machined parts. It is mostly built up of welding together flat bars and angles. The bearings are all of a standard and easily obtainable type, and are obtainable from dealers who are located wherever tool bars, rod weeders and other grain land farm machinery are used.

The main drive shaft 9a, 10, 11a is of the telescoping type for reasons previously stated, and is located between each wheel frame 4 and the center main bearing 12. The universal joints 9 and 11 at either end allow the drive wheel frames 4 to move vertically independently of each other and with respect to the relatively fixed shaft of the chain sprocket 12c; also the use of universal joints 9 and 11 allow for variations in tool bar ground wheel size which usually is slight and of little consequence until the ground wheels L accumulate mud, as in a rain or in passing through wet spots as sometimes happens.

The make of tool bar, or cultivator, illustrated in the drawings is the Graham-Hoeme; however, my rod weeder attachment can be adapted to fit nearly all other makes by modifying the mounting brackets 32; and center main bearing 12 and jack shaft base 18.

There are no ratchets in the drive wheels of my attachment. They are unnecessary as the drive wheels 5 will slip on the tool bar ground wheels L when going around a curve. No harm is done any of the parts by this action; or to the tires on either the tool bar ground wheels or on the rod weeder drive wheels 5.

I do not limit my invention to the exact form shown in the drawings, for obviously changes may be made therein within the scope of the claims.

I claim:

1. In combination with a tool bar frame vertically adjustably mounted on ground wheels having pneumatic tires and having a rearmost row of cultivator tool bars having curved shanks; a rod weeder attachment mounted on said frame comprising vertically pivotal frames each carrying a drive wheel having a pneumatic tire adapted to frictionally engage its related ground wheel when the tool bar frame is lowered with respect to said ground wheel; means yieldably depressing the free ends of said pivotal frames; a chain sprocket journaled in a center main bearing disposed between the drive wheels; flexible shaft sections connecting the drive wheels and the chain sprocket; a second chain sprocket journaled in a jack shaft assembly mounted on the tool bar frame in rear of the center main bearing; a chain running around the said sprockets; a third chain sprocket on the shaft of said second sprocket disposed in substantial alignment with one of said cultivator tool bars; a boot mounted on said one cultivator tool bar; a fourth chain sprocket on a shaft journaled in the upper end of the boot and disposed in alignment with the third chain sprocket; a second chain running around said third and fourth chain sprockets; a fifth chain sprocket within the upper end of the boot mounted on said last named shaft; a non-circular shaft journaled in the lower end of the boot; a sixth sprocket mounted on said non-circular shaft; a third chain running around the fifth and sixth sprockets within said boot; bearings mounted on the cultivator tool bars of said row at each side of the boot; non-circular rod weeder shafts journaled in said bearings in alignment with the non-circular shaft of the boot and connected thereto by universal joints, said rods being adapted to rotatively engage the ground surface when the tool bar frame is lowered with respect to the ground wheels to bring the lower ends of the cultivator tool bars below the ground surface; pairs of front and rear uprights receiving therebetween the pivotal frames respectively mounted on the tool bar frame; rods extending through each pair of rear uprights and through the frames to form pivots therefor; said frames carrying at their sides bearings for their related drive wheels; and the pairs of front uprights each receiving therebetween the front ends of the frames.

2. In a combination as set forth in claim 1, said yieldably depressing means comprising vertical rods pivotally secured at their lower ends to the front uprights and passing upwardly through holes in the frames; and coiled springs under compression inserted between the frames and heads on the upper ends of the rods for normally depressing the free ends of the frames.

3. In combination with a tool bar frame vertically adjustably mounted on ground wheels having pneumatic tires and having a rearmost row of cultivator tool bars having curved shanks; a rod weeder attachment mounted on said frame comprising vertically pivotal frames each carrying a drive wheel having a pneumatic tire adapted to frictionally engage its related ground wheel when the tool bar frame is lowered with respect to said ground wheel; means yieldably depressing the free ends of said pivotal frames; a chain sprocket journaled in a center main bearing disposed between the drive wheels; flexible shaft sections connecting the drive wheels and the chain sprocket; a second chain sprocket journaled in a jack shaft assembly mounted on the tool bar frame in rear of the center main bearing; a chain running around the said sprockets; a third chain sprocket on the chain of said second sprocket disposed in substantial alignment with one of said cultivator tool bars; a boot mounted on said one cultivator tool bar; a fourth chain sprocket on a shaft journaled in the upper end of the boot and disposed in alignment with the third chain sprocket; a second chain running around said third and fourth chain sprockets; a fifth chain sprocket within the upper end of the boot mounted on said last named shaft; a non-circular shaft journaled in the lower end of the boot; a sixth sprocket mounted on said non-circular shaft; a third chain running around the fifth and sixth sprockets within said boot; bearings mounted on the cultivator tool bars of said row at each side of the boot; non-circular rod weeder shafts journaled in said bearings in alignment with the non-circular shaft of the boot and connected thereto by universal joints, said rods being adapted to rotatively engage the ground surface when the tool bar frame is lowered with respect to the ground wheels to bring the lower ends of the cultivator tool bars below the ground surface; said jack shaft assembly comprising a bolting base having spaced uprights provided with journals for the second chain sprocket; and a mounting plate mounted on said tool bar and having slots therein receiving hold-down bolts passing through the assembly base and slots, whereby the assembly may be adjustably mounted on the plate.

4. In a combination as set forth in claim 1, said shaft for the second chain sprocket being replaceable by a longer shaft whereby the third chain sprocket may be disposed opposite the fourth chain sprocket carried by the boot in event the boot is not mounted on the central tool bar of the frame.

5. In combination with a tool bar frame vertically adjustably mounted on ground wheels provided with pneumatic tires and disposed at each side and having a row of cultivator tool bars having curved shanks at its rear end; a rod weeder attachment mounted on said frame comprising vertically pivotal frames each carrying a drive wheel provided with a pneumatic tire adapted to frictionally engage its related ground wheel when the tool bar frame is lowered with respect to said ground wheel; means yieldably depressing the free ends of said pivotal frames; means for locking the pivotal frames in raised positions; a chain sprocket journaled in a center main bearing on the central axis of the tool bar frame; telescoping shaft sections connecting through universal joints the drive wheels and the chain sprocket; a second chain sprocket journaled in a jack shaft assembly mounted on the central axis of the tool bar frame; a chain running around the said sprockets; a third chain sprocket on the shaft of said second sprocket disposed substantially parallel with the central cultivator tool bar; a boot mounted on said central cultivator tool bar; a fourth chain sprocket on a shaft journaled in the upper end of the boot and disposed at one side of the boot in substantial alignment with the third chain sprocket; a second chain running around said third and fourth chain sprockets; a fifth chain sprocket within the upper end of the boot mounted on said last named shaft; a non-circular shaft journaled in the lower end of the boot; a sixth sprocket mounted on said non-circular shaft; a third chain running around the fifth and sixth sprockets within said boot; bearings mounted on the cultivator tool bars of said row at each side of the boot; non-circular rod weeder shafts journaled in said bearings in alignment with the non-circular shaft of the boot and connected thereto by universal joints, said rods being adapted to rotatively engage the ground surface when the tool bar frame is lowered with respect to the ground wheels to bring the lower ends of the cultivator tool bars below the ground surface; pairs of front and rear uprights receiving therebetween the pivotal frames respectively and adjustably mounted on the tool bar frame; rods extending through each pair of rear uprights and through the frames to form pivots therefor; said frames being open and carrying at their sides bearings for the related drive wheels; and the pairs of front uprights each receiving therebetween the front ends of the frames.

6. In a combination as set forth in claim 5, said yieldably depressing means comprising vertical rods pivotally secured at their lower ends to the front uprights and passing upwardly through holes in the frames; and coiled springs under compression inserted between the frames and heads on the upper ends of the rods for normally depressing the free ends of the frames.

7. In a combination as set forth in claim 5, said locking means comprising removable rods adapted to be inserted through perforations in the upper portions of the pairs of front uprights respectively to engage the underside of the frames when raised.

8. In combination with a tool bar frame vertically adjustably mounted on ground wheels provided with pneumatic tires and disposed at each side and having a row of cultivator tool bars having curved shanks at its rear end; a rod weeder attachment mounted on said frame comprising vertically pivotal frames each carrying a drive wheel provided with a pneumatic tire adapted to frictionally engage its related ground wheel when the tool bar frame is lowered with respect to said ground wheel; means yieldably depressing the free ends of said pivotal frames; means for locking the pivotal frames in raised positions; a chain sprocket journaled in a center main bearing on the central axis of the tool bar frame; telescoping shaft sections connecting through universal joints the drive wheels and the chain sprocket; a second chain sprocket journaled in a jack shaft assembly mounted on the central axis of the tool bar frame; a chain running around the said sprockets; a third chain sprocket on the shaft of said second sprocket disposed substantially parallel with the central cultivator tool bar; a boot mounted on said central cultivator tool bar; a fourth chain sprocket on a shaft journaled in the upper end of the boot and disposed at one side of the boot in substantial alignment with the third chain sprocket; a second chain running around said third and fourth chain sprockets; a fifth chain sprocket within the upper end of the boot mounted on said last named shaft; a non-circular shaft journaled in the lower end of the boot; a sixth sprocket mounted on said non-circular shaft; a third chain running around the fifth and sixth sprockets within said boot; bearings mounted on the cultivator tool bars of said row at each side of the boot; non-circular rod weeder shafts journaled in said bearings in alignment with the non-circular shaft of the boot and connected thereto by universal joints, said rods being adapted to rotatively engage the ground surface when the tool bar frame is lowered with respect to the ground wheels to bring the lower ends of the cultivator tool bars below the ground surface; the ends of the telescoping shaft sections adjacent the universal joints being of non-circular shape and slidably engaging similar non-circular bores in the ends of floating shaft connecting members to permit axial extension or reduction of the lengths of the shaft sections as the pivotal frames carrying the drive wheel move vertically with respect to the ground wheels.

9. In combination with a tool bar frame vertically adjustably mounted on ground wheels provided with pneumatic tires and disposed at each side and having a row of cultivator tool bars having curved shanks at its rear end; a rod weeder attachment mounted on said frame comprising vertically pivotal frames each carrying a drive wheel provided with a pneumatic tire adapted to frictionally engage its related ground wheel when the tool bar frame is lowered with respect to said ground wheel; means yieldably depressing the free ends of said pivotal frames; means for locking the pivotal frames in raised positions; a chain sprocket journaled in a center main bearing on the central axis of the tool bar frame; telescoping shaft sections connecting through universal joints the drive wheels and the chain sprocket; a second chain sprocket journaled in a jack shaft assembly mounted on the central axis of the tool bar frame; a chain running around the said sprockets; a third chain sprocket on the shaft of said second sprocket disposed substantially parallel with the central cultivator tool bar; a boot mounted on said central cultivator tool bar; a fourth chain sprocket on a shaft journaled in the upper end of the boot and disposed at one side of the boot in substantial alignment with the third chain sprocket; a second chain running around said third and fourth chain sprockets; a fifth chain sprocket within the upper end of the boot mounted on said last named shaft; a non-circular shaft journaled in the lower end of the boot; a sixth sprocket mounted on said non-circular shaft; a third chain running around the fifth and sixth sprockets within said boot; bearings mounted on the cultivator tool bars of said row at each side of the boot; non-circular rod weeder shafts journaled in said bearings in alignment with the non-circular shaft of the boot and connected thereto by universal joints, said rods being adapted to rotatively engage the ground surface when the tool bar frame is lowered with respect to the ground wheels to bring the lower ends of the cultivator tool bars below the ground surface; said center main bearing comprising a base having spaced uprights provided with journals for the first chain sprocket; and means for adjustably mounting the bearing on the tool bar frame.

10. In combination with a tool bar frame vertically adjustably mounted on ground wheels provided with pneumatic tires and disposed at each side and having a row of cultivator tool bars having curved shanks at its rear end; a rod weeder attachment mounted on said frame comprising vertically pivotal frames each carrying a drive wheel provided with a pneumatic tire adapted to frictionally engage its related ground wheel when the tool bar frame is lowered with respect to said ground wheel; means yieldably depressing the free ends of said pivotal frames; means for locking the pivotal frames in raised positions; a chain sprocket journaled in a center main bearing on the central axis of the tool bar frame; telescoping shaft sections connecting through universal joints the drive wheels and the chain sprocket; a second chain sprocket journaled in a jack shaft assembly mounted on the central axis of the tool bar frame; a chain running around the said sprockets; a third chain sprocket on the shaft of said second sprocket disposed substantially parallel with the central cultivator tool bar; a boot mounted on said central cultivator tool bar; a fourth chain sprocket on a shaft journaled in the upper end of the boot and disposed at one side of the boot in substantial alignment with the third chain sprocket; a second chain running around said third and fourth chain sprockets; a fifth chain sprocket within the upper end of the boot mounted on said last named shaft; a non-circular shaft journaled in the lower end of the boot; a sixth sprocket mounted on said non-circular shaft; a third chain running around the fifth and sixth sprockets within said boot; bearings mounted on the cultivator tool bars of said row at each side of the boot; non-circular rod weeder shafts journaled in said bearings in alignment with the non-circular shaft of the boot and connected thereto by universal joints, said rods being adapted to rotatively engage the ground surface when the tool bar frame is lowered with respect to the ground wheels to bring the lower ends of the cultivator tool bars below the ground surface; said jack shaft assembly comprising a bolting base having spaced uprights provided with journals for the second chain sprocket; and a mounting plate mounted on said tool bar and having slots therein receiving hold-down bolts passing through the assembly base and slots, whereby the assembly may be adjustably mounted on the plate.

11. In a combination as set forth in claim 10, said shaft for the second chain sprocket being replaceable by a longer shaft whereby the third chain sprocket may be disposed opposite the fourth chain sprocket carried by the boot in event the boot is not mounted on the central tool bar of the frame.

12. In combination with a tool bar frame vertically adjustably mounted on ground wheels provided with pneumatic tires and disposed at each side and having a row of cultivator tool bars having curved shanks at its rear end; a rod weeder attachment mounted on said frame comprising vertically pivotal frames each carrying a drive wheel provided with a pneumatic tire adapted to frictionally engage its related ground wheel when the tool bar frame is lowered with respect to said ground wheel; means yieldably depressing the free ends of said pivotal frames; means for locking the pivotal frames in raised positions; a chain sprocket journaled in a center main bearing on the central axis of the tool bar frame; telescoping shaft sections connecting through universal joints the drive wheels and the chain sprocket; a second chain sprocket journaled in a jack shaft assembly mounted on the central axis of the tool bar frame; a chain running around the said sprockets; a third chain sprocket on the shaft of said second sprocket disposed substantially parallel with the central cultivator tool bar; a boot mounted on said central cultivator tool bar; a fourth chain sprocket on a shaft journaled in the upper end of the boot and disposed at one side of the boot in substantial alignment with the third chain sprocket; a second chain running around said third and fourth chain sprockets; a fifth chain sprocket within the upper end of the boot mounted on said last named shaft; a non-circular shaft journaled in the lower end of the boot; a sixth sprocket mounted on said non-circular shaft; a third chain running around the fifth and sixth sprockets within said boot; bearings mounted on the cultivator tool bars of said row at each side of the boot; non-circular rod weeder shafts journaled in said bearings in alignment with the non-circular shaft of the boot and connected thereto by universal joints, said rods being adapted to rotatively engage the ground surface when the tool bar frame is lowered with respect to the ground wheels to bring the lower ends of the cultivator tool bars below the ground surface; said boot comprising a substantially rectangular closed casing of width approximating that of the tool bar and having its front face formed arcuately to conform with the curvature of the tool bar shank; means for removably mounting the boot on the tool bar shank with its lower end elevated above the ground level when the tool bar frame is lowered with respect to the ground wheels; and a hardened bottom plate removably mounted at the lower end of the boot to prevent wear on the boot during operation and to prevent accumulation of dirt within the bottom of the boot.

13. In combination with a tool bar frame vertically adjustably mounted on ground wheels having pneumatic tires and having a rearmost row of cultivator tool bars having curved shanks; a rod weeder attachment mounted on said frame comprising vertically pivotal frames each carrying a drive wheel having a pneumatic tire adapted to frictionally engage its related ground wheel when the tool bar frame is lowered with respect to said ground wheel; means yieldably depressing the free ends of said pivotal frames; a chain sprocket journaled in a center main bearing disposed between the drive wheels; flexible shaft sections connecting the drive wheels and the chain sprocket; a boot mounted on said central cultivator tool bar; a second chain sprocket on a shaft journaled in the upper end of the boot and disposed at one side of the boot; means for driving the second chain sprocket from the first chain sprocket; a third chain sprocket within the upper end of the boot mounted on said last named shaft; a non-circular shaft journaled in the lower end of the boot; a fourth sprocket mounted on said non-circular shaft; a chain running around the third and fourth sprockets within said boot; bearings mounted on the cultivator tool bars of said row at each side of the boot; non-circular rod weeder shafts journaled in said bearings in alignment with the non-circular shaft of the boot and connected thereto by universal joints, said rods being adapted to rotatively engage the ground surface when the tool bar frame is lowered with respect to the ground wheels to bring the lower ends of the cultivator tool bars below the ground surface; pairs of front and rear uprights receiving therebetween the pivotal frames respectively and mounted on the tool bar frame; rods extending through each pair of rear uprights and through the frames to form pivots therefor; said frames carrying at their sides bearings for their related drive wheels; and the pairs of front uprights each receiving therebetween the front ends of the frames.

14. In a combination as set forth in claim 13, said yieldably depressing means comprising vertical rods pivotally secured at their lower ends to the front uprights and passing upwardly through holes in the frames; and coiled springs under compression inserted between the frames and heads on the upper ends of the rods for normally depressing the free ends of the frames.

References Cited by the Examiner

UNITED STATES PATENTS

| | | | |
|---|---|---|---|
| Re. 13,899 | 4/1915 | Wolfe | 172—44 |
| 784,911 | 3/1905 | Young | 172—106 X |
| 1,071,075 | 8/1913 | Moon | 172—44 |
| 1,176,883 | 3/1916 | Crawford | 172—44 |
| 2,539,037 | 1/1951 | Shields | 172—44 |
| 2,614,475 | 10/1952 | Mowbray | 172—44 |
| 2,892,504 | 6/1959 | Mowbray | 172—44 |
| 2,954,085 | 9/1960 | Roberts | 172—44 |
| 3,086,597 | 2/1962 | McClenny et al. | 172—273 X |
| 3,101,786 | 8/1963 | Hunter et al. | 172—44 |
| 3,115,940 | 12/1963 | Heinrich | 172—44 |
| 3,208,536 | 9/1965 | Orendorff | 172—105 X |
| 3,213,698 | 10/1965 | Gandrud | 172—105 X |

OTHER REFERENCES

John Deere 500 Series Rod Weeder Operator's Manual, OM-N97529N, pages 5, 25 and 36 relied on.

ABRAHAM G. STONE, *Primary Examiner.*

R. L. HOLLISTER, *Assistant Examiner.*